US010621008B2

(12) United States Patent
Huang et al.

(10) Patent No.: US 10,621,008 B2
(45) Date of Patent: Apr. 14, 2020

(54) ELECTRONIC DEVICE WITH MULTI-CORE PROCESSOR AND MANAGEMENT METHOD FOR MULTI-CORE PROCESSOR

(71) Applicant: HTC Corporation, Taoyuan (TW)

(72) Inventors: Chun-Ming Huang, Taoyuan (TW); You-Lung Hsueh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 172 days.

(21) Appl. No.: 15/249,470

(22) Filed: Aug. 28, 2016

(65) Prior Publication Data

US 2017/0212792 A1 Jul. 27, 2017

Related U.S. Application Data

(60) Provisional application No. 62/286,451, filed on Jan. 25, 2016.

(51) Int. Cl.
```
G06F 9/50      (2006.01)
G06F 1/329     (2019.01)
G06F 1/324     (2019.01)
G06F 1/3206    (2019.01)
G06F 1/3228    (2019.01)
G06F 9/48      (2006.01)
```

(52) U.S. Cl.
CPC ............ *G06F 9/5083* (2013.01); *G06F 1/324* (2013.01); *G06F 1/3206* (2013.01); *G06F 1/329* (2013.01); *G06F 1/3228* (2013.01); *G06F 9/4881* (2013.01); *Y02D 10/126* (2018.01); *Y02D 10/24* (2018.01)

(58) Field of Classification Search
CPC ..................................................... G06F 9/5083
See application file for complete search history.

(56) References Cited

U.S. PATENT DOCUMENTS

| 2009/0164399 | A1  | 6/2009 | Bell, Jr. et al. | |
| 2014/0095904 | A1* | 4/2014 | Ananthakrishnan | G06F 1/3293 713/320 |
| 2014/0189387 | A1* | 7/2014 | Vilhauer | G06F 1/3234 713/320 |

(Continued)

FOREIGN PATENT DOCUMENTS

| TW | 201342244 A | 10/2013 |
| TW | 201527950 A | 7/2015 |

OTHER PUBLICATIONS

Corresponding Taiwanese office action dated Oct. 20, 2017.

*Primary Examiner* — Charlie Sun
(74) *Attorney, Agent, or Firm* — CKC & Partners Co., LLC

(57) ABSTRACT

A management method for a multi-core processor includes determining a plurality of candidate processor configurations with computing performances greater than a current computing performance corresponding to a current processor configuration, in which each of the candidate processor configurations comprises an active processor core number and a processor frequency; selecting one of the candidate processor configurations according to power consumptions corresponding to the candidate processor configurations to serve as an updating processor configuration; and executing tasks according to the active processor core number and the processor frequency of the updating processor configuration.

17 Claims, 5 Drawing Sheets

(56) References Cited

U.S. PATENT DOCUMENTS

2015/0046737 A1* 2/2015 Hattori ............... G01C 19/5776
713/324
2017/0205863 A1* 7/2017 Lee ........................ G06F 1/28

* cited by examiner

ELECTRONIC DEVICE WITH MULTI-CORE PROCESSOR AND MANAGEMENT METHOD FOR MULTI-CORE PROCESSOR

RELATED APPLICATIONS

This application claims priority to U.S. Application Ser. No. 62/286,451, filed Jan. 25, 2016, which is herein incorporated by reference.

BACKGROUND

Technical Field

The present disclosure relates to a device and a method. More particularly, the present disclosure relates to an electronic device with a multi-core processor, and to a management method for a multi-core processor.

Description of Related Art

With advances in electronic technology, electronic devices with multi-core processors are being increasingly used.

A multi-core processor has a plurality of processor cores. The processor cores can be separately activated or deactivated according to actual requirements. The larger the number of processor cores that are activated, the greater the performance and the power consumption of the multi-core processor, and vice versa. Therefore, the management of the multi-core processor is an important area of research in the related field.

SUMMARY

One aspect of the present disclosure is related to a management method for a multi-core processor. In accordance with one embodiment of the present disclosure, the management method includes determining a plurality of candidate processor configurations with computing performances greater than a current computing performance corresponding to a current processor configuration, in which each of the candidate processor configurations includes an active processor core number and a processor frequency; selecting one of the candidate processor configurations according to power consumptions corresponding to the candidate processor configurations to serve as an updating processor configuration; and executing tasks according to the active processor core number and the processor frequency of the updating processor configuration.

Another aspect of the present disclosure is related to an electronic device. In accordance with one embodiment of the present disclosure, the electronic device includes a multi-core processor, a memory, and one or more programs. The memory is electrically connected to the multi-core processor. The one or more programs are stored in the memory and configured to be executed by the multi-core processor. The one or more programs include instructions for determining a plurality of candidate processor configurations with computing performances greater than a current computing performance corresponding to a current processor configuration, in which each of the candidate processor configurations includes an active processor core number and a processor frequency; selecting one of the candidate processor configurations according to power consumptions corresponding to the candidate processor configurations to serve as an updating processor configuration; and executing tasks according to the active processor core number and the processor frequency of the updating processor configuration.

Another aspect of the present disclosure is related to a management method for a multi-core processor. In accordance with one embodiment of the present disclosure, the management method includes determining a plurality of candidate processor configurations with power consumptions lower than a current power consumption corresponding to a current processor configuration, in which each of the candidate processor configurations includes an active processor core number and a processor frequency; selecting one of the candidate processor configurations according to computing performances corresponding to the candidate processor configurations to serve as an updating processor configuration; and executing tasks according to the active processor core number and the processor frequency of the updating processor configuration.

Another aspect of the present disclosure is related to an electronic device. In accordance with one embodiment of the present disclosure, the electronic device includes a multi-core processor, a memory, and one or more programs. The memory is electrically connected to the multi-core processor. The one or more programs are stored in the memory and configured to be executed by the multi-core processor. The one or more programs include instructions for determining a plurality of candidate processor configurations with power consumptions lower than a current power consumption corresponding to a current processor configuration, in which each of the candidate processor configurations includes an active processor core number and a processor frequency; selecting one of the candidate processor configurations according to computing performances corresponding to the candidate processor configurations to serve as an updating processor configuration; and executing tasks according to the active processor core number and the processor frequency of the updating processor configuration.

Through the operations of one embodiment described above, the performance of the multi-core processor can be increased while taking into consideration power consumption.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
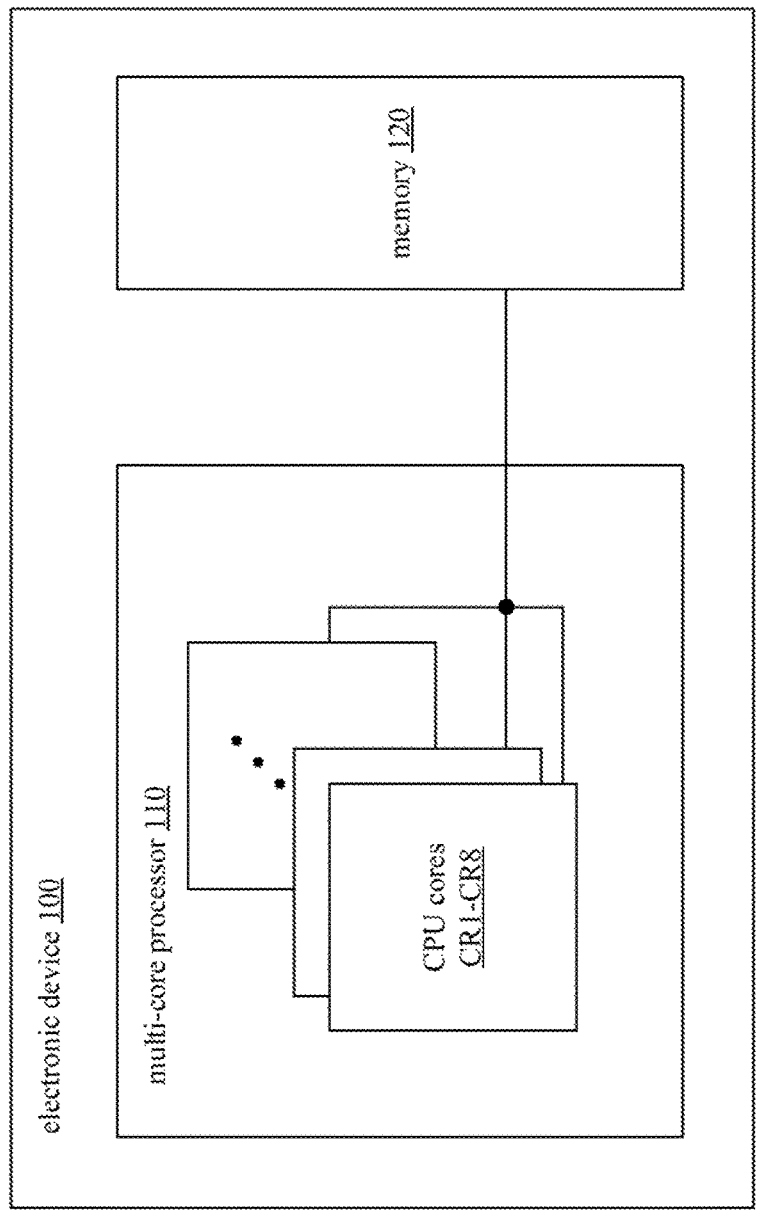
FIG. 1 is a schematic block diagram of an electronic device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to an electronic device. In the paragraphs below, a smart phone will be taken as an example to describe details of the electronic device. However, another electronic device, such as a desktop computer or tablet computer, is within the contemplated scope of the present disclosure.

FIG. 1 is a schematic block diagram of an electronic device 100 in accordance with one embodiment of the present disclosure. In this embodiment, the electronic device 100 includes a multi-core processor 110 and a memory 120. In this embodiment, the multi-core processor 110 is electrically connected to the memory 120.

In one embodiment, the multi-core processor 110 includes processor cores CR1-CR8. In one embodiment, the processor cores CR1-CR8 are electrically connected to the memory 120. In one embodiment, the processor cores CR1-CR8 may be CPU cores. In one embodiment, the processor cores CR1-CR8 may be executed with various processor frequencies (e.g., CPU frequencies). It should be noted that another number of the processor cores are within the contemplated scope of the present disclosure.

In one embodiment, the processor cores CR1-CR8 can be realized by using, for example, one or more processor chips or processing circuits, but are not limited in this regard. In one embodiment, the memory 120 may include one or more memory devices, each of which comprises, or a plurality of which collectively comprise a computer readable storage medium. The memory 120 may include a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In one embodiment, the multi-core processor 110 may run or execute various software programs and/or sets of instructions stored in the memory 120 to perform various functions for the electronic device 100.

In one embodiment, the memory 120 stores a plurality of processor configurations. Each of the processor configurations includes an active processor core number and a processor frequency. The multi-core processor 110 can activate a certain number of the processor cores CR1-CR8 with a certain processor frequency according to one of the processor configurations (i.e., a current processor configuration) stored in the memory 120 to execute tasks. For example, when the active processor core number of the current processor configuration is 3, and the processor frequency of the current processor configuration is 1.3 GHz, the multi-core processor 110 activates 3 processor cores (e.g., processor cores CR1-CR3) with processor frequencies of the 3 activated processor cores being 1.3 GHz to execute the tasks.

When there is a need to increase the performance of the multi-core processor 110, the multi-core processor 110 can determine (e.g., perform an initial selection) a plurality of candidate processor configurations from the processor configurations stored in the memory 120, in which the computing performances corresponding to all of the candidate processor configurations are greater than the computing performance corresponding to the current processor configuration.

Subsequently, the multi-core processor 110 can select one of the candidate processor configurations according to the power consumptions corresponding to the candidate processor configurations to serve as an updating processor configuration. Subsequently, the multi-core processor 110 can update the current processor configuration with the updating processor configuration, so as to execute the tasks according to the active processor core number and the processor frequency of the updating processor configuration. For example, when the active processor core number of the updating processor configuration is 4, and the processor frequency of the updating processor configuration is 1.1 GHz, the multi-core processor 110 activates 4 processor cores (e.g., processor cores CR1-CR4) with processor frequencies of the 4 activated processor cores being 1.1 GHz to execute the task.

On the other hand, when there is a need to decrease the performance or the power consumption of the multi-core processor 110, the multi-core processor 110 can determine which of the candidate processor configurations stored in the memory 120 have power consumptions that are lower than the power consumption corresponding to the current processor configuration, and designates these processor configurations as candidate processor configurations.

Substantially, the multi-core processor 110 can select one of the candidate processor configurations according to the computing performances corresponding to the candidate processor configurations to serve as an updating processor configuration. Substantially, the multi-core processor 110 can update the current processor configuration with the updating processor configuration, so as to execute the tasks according to the active processor core number and the processor frequency of the updating processor configuration.

Through the operations described above, the performance of the multi-core processor 110 can be increased or decreased while taking into consideration power consumption.

Details of the present disclosure are described in the paragraphs below with reference to a management method in FIG. 2. However, the present disclosure is not limited to the embodiment below.

Figure 2:
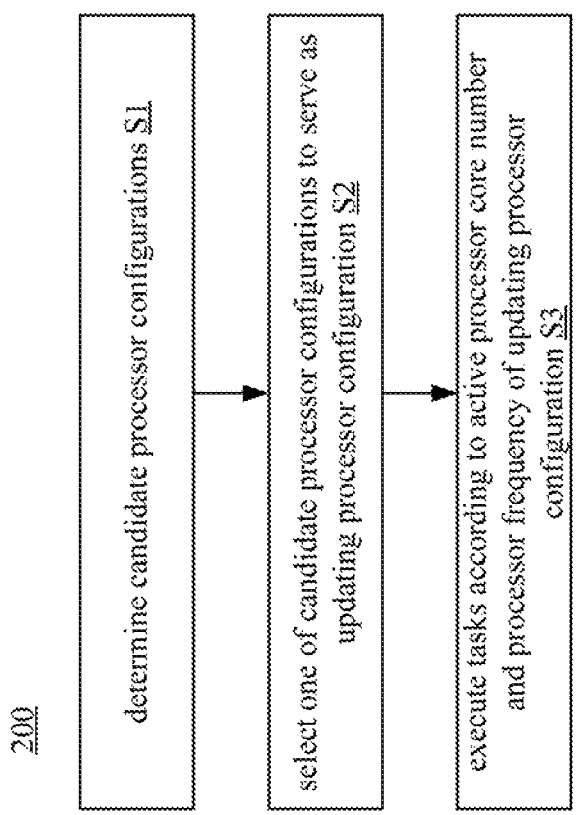
FIG. 2 is a flowchart of a management method in accordance with one embodiment of the present disclosure.

Reference is made to FIGS. 1 and 2. The management method 200 includes the operations below.

In operation S1, the multi-core processor 110 determines a plurality of candidate processor configurations with computing performances greater than a current computing performance corresponding to the current processor configuration. In one embodiment, the candidate processor configurations are a part of processor configurations stored in the memory 120. In one embodiment, each of the candidate processor configurations includes an active processor core number and a processor frequency.

In one embodiment, the determination of the candidate processor configurations is executed when there is a need to increase the performance of the multi-core processor 110. In one embodiment, when the average processor usage of the activated processor cores is greater than a predetermined threshold (e.g., 80%), it is determined that there is a need to increase the performance of the multi-core processor 110. In one embodiment, when a performance increasing request is received (e.g., from a user, operating system scheduler, or an interior/exterior controller), it is determined that there is a need to increase the performance of the multi-core processor 110. It should be noted that, there can be a need to increase the performance of the multi-core processor 110 under various conditions, and the present disclosure is not limited to the embodiment above.

In operation S2, the multi-core processor 110 selects one of the candidate processor configurations according to power consumptions corresponding to the candidate processor configurations to serve as an updating processor configuration.

In one embodiment, the multi-core processor 110 may select one of the candidate processor configurations corresponding to a power consumption lower than the power consumptions corresponding to the other candidate processor configurations. That is, the power consumption corresponding to the selected candidate processor configuration (i.e., the updating processor configuration) may be the lowest among the power consumptions corresponding to the candidate processor configurations.

In operation S3, after the updating processor configuration is determined, the multi-core processor 110 executes the tasks according to the active processor core number and the processor frequency of the updating processor configuration.

Through the operations described above, the performance of the multi-core processor 110 can be increased while taking into consideration power consumption.

In one embodiment of the present disclosure, in operation S1, the multi-core processor 110 may further acquire a number of maximum effective processor cores. In one embodiment, the number of the maximum effective processor cores corresponds to a maximum number of the pending tasks being able to be concurrently executed. For example, when the pending tasks of the multi-core processor 110 are able to be concurrently executed by at most 5 processors, the number of the maximum effective processor cores may be 5. In one embodiment, the number of the maximum effective processor cores is equal to the current run-queue length of the multi-core processor 110.

After the number of the maximum effective processor cores is acquired, the multi-core processor 110 determines the candidate processor configurations with the computing performances greater than the current computing performance corresponding to the current processor configuration and with active processor core numbers not greater than the number of the maximum effective processor cores. For example, when the number of the maximum effective processor cores is 4, only the processor configurations with active processor core numbers equal to or less than 4 will be selected as the candidate processor configurations.

With such operations, activating more processor cores than what is needed can be avoided, so as to avoid wasting resources.

In one embodiment of the present disclosure, in operation S2, when there is a need to increase the performance of the multi-core processor 110 more significantly, the multi-core processor 110 may select the updating processor configuration with the operations described below.

Firstly, the multi-core processor 110 can select a preliminary selected processor configuration of the candidate processor configurations with a power consumption lower than power consumptions corresponding to the other of the candidate processor configurations.

Subsequently, the multi-core processor 110 can determine a plurality of secondary candidate processor configurations with computing performances greater than a computing performance corresponding to the preliminary selected processor configuration, in which the secondary candidate processor configurations are within the candidate processor configurations.

After the secondary candidate processor configurations are determined, the multi-core processor 110 can select one of the secondary candidate processor configurations according to power consumptions corresponding to the secondary candidate processor configurations to serve as the updating processor configuration. In one embodiment, the power consumption corresponding to the selected one of the secondary candidate processor configurations (i.e., the updating processor configuration) is lower than power consumptions corresponding to the other of the secondary candidate processor configurations.

It should be noted that the operations described above can be iterated one or more times depending on actual requirements, and the present disclosure is not limited to the embodiment above.

In some embodiments, when the average processor usage of the activated processor cores is greater than a predetermined threshold (e.g., 90%), or the average processor usage of the activated processor cores is greater than a predetermined threshold (e.g., 80%) for a certain period (e.g., 200 ms), there may be a need to increase the performance of the multi-core processor 110 more significantly.

With such operations, the performance of the multi-core processor 110 can be increased in a more significant or substantial manner.

To allow the disclosure to be more fully understood, an illustrative example is described in the paragraphs below, but the present disclosure is not limited to the example below.

In this illustrative example, the processor configurations stored in the memory 120 are illustrated in table TB1 below with corresponding computing performances and corresponding power consumptions. The computing performances are presented by using Dhrystone Million Instructions per Second (DMIPS), and the power consumptions are presented by using power in running (mA). It should be noted that other ways of presenting the computing performances and the power consumptions are within the contemplated scope of the present disclosure.

TABLE TB1

| processor configuration number | DMIPS | active processor core number | processor frequency | power in running (mA) |
|---|---|---|---|---|
| ... | ... | ... | ... | ... |
| #0 | 11490000 | 3 | 1.2 GHz | 350 |
| #1 | 11491670 | 3 | 1.3 GHz | 400 |
| #2 | 11631029 | 5 | 0.8 GHz | 406 |
| #3 | 12322217 | 2 | 2.1 GHz | 604 |
| #4 | 12951755 | 3 | 1.4 GHz | 451 |
| #5 | 13501150 | 4 | 1.1 GHz | 423 |
| #6 | 14191478 | 6 | 0.8 GHz | 455 |
| #7 | 14395001 | 3 | 1.6 GHz | 517 |
| #8 | 15215161 | 4 | 1.3 GHz | 470 |
| #9 | 18155680 | 8 | 0.8 GHz | 533 |
| ... | ... | ... | ... | ... |

In one embodiment, the electronic device 100 may measure in advance the computing performances and the power consumptions corresponding to each of the processor configurations and store the measured computing performances and power consumptions corresponding to the processor configurations in the memory 120. In one embodiment, the electronic device 100 may sort the processor configurations according to the number of the corresponding computing performances.

In an alternative embodiment, the electronic device 100 may acquire the computing performances and the power consumptions corresponding to the processor configurations from another device and store the data in the memory 120. In another embodiment, the computing performances and the power consumptions corresponding to the processor configurations are stored in the memory 120 in advance.

In this illustrative example, the current processor configuration is the processor configuration #1, and the number of the maximum effective processor cores is 4. When there is a need to increase the performance of the multi-core processor 110, the multi-core processor 110 determines that the processor configurations #3, #4, #5, #7, #8 are the candidate processor configurations with the computing performances greater than the current computing performance and the active processor core number not greater than the number of the maximum effective processor cores.

Subsequently, the multi-core processor 110 selects the processor configuration #5 from the candidate processor configurations as the updating processor configuration because the power consumption corresponding to the processor configuration #5 is the lowest among the power consumptions corresponding to the candidate processor configurations. Subsequently, the processor configuration #5 is applied and the tasks are executed by the multi-core processor 110 according to the processor configuration #5.

In an alternative embodiment, when there is a need to increase the performance of the multi-core processor 110 more significantly, after the processor configurations #3, #4, #5, #7, #8 are determined as the candidate processor configurations, the multi-core processor 110 selects the processor configuration #5 from the candidate processor configurations as the preliminary selected processor configuration because the power consumption corresponding to the processor configuration #5 is the lowest among the power consumptions corresponding to the candidate processor configurations.

Subsequently, the multi-core processor 110 determines that the processor configurations #7, #8 are secondary candidate processor configurations with the computing performances greater than the computing performance corresponding to the preliminary selected processor configuration (i.e., the processor configuration #5) and the active processor core numbers not greater than the number of the maximum effective processor cores.

Subsequently, the multi-core processor 110 selects the processor configuration #8 from the secondary candidate processor configurations as the updating processor configuration because the power consumption corresponding to the processor configuration #8 is the lowest among the power consumptions corresponding to the secondary candidate processor configurations. Subsequently, the processor configuration #8 is applied and the tasks are executed by the multi-core processor 110 according to the processor configuration #8.

Through the operations described above, the performance of the multi-core processor 110 can be increased while taking into consideration power consumption.

Another embodiment of the present disclosure is described in the paragraphs below with reference to a management method in FIG. 3. However, the present disclosure is not limited to the embodiment below.

Figure 3:
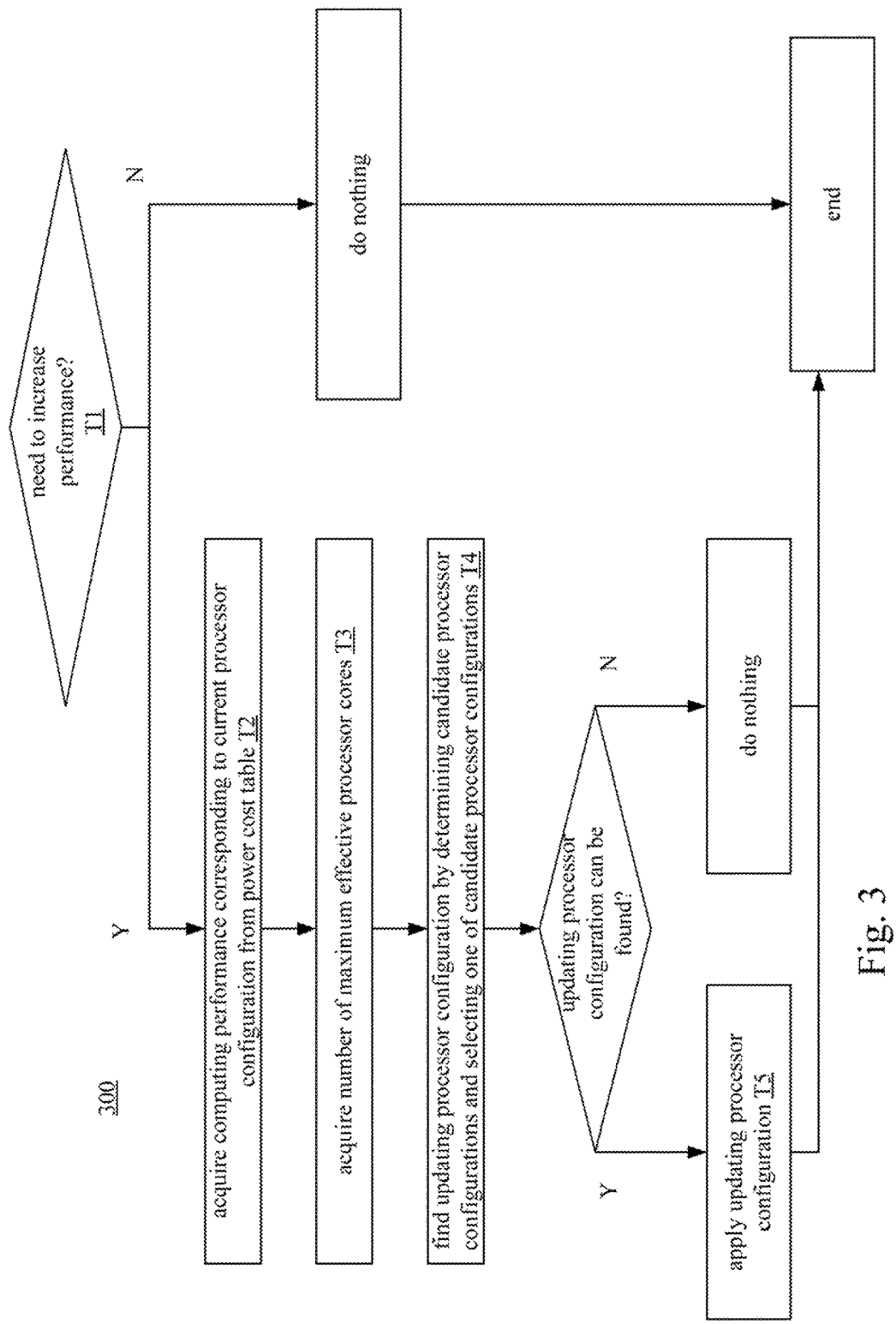
FIG. 3 is a flowchart of a management method in accordance with another embodiment of the present disclosure.

Reference is made to FIGS. 1 and 3. The management method 300 includes the operations below.

In operation T1, the multi-core processor 110 determines whether there is a need to increase the performance of the multi-core processor 110. If so, operation T2 is performed. If not, the multi-core processor 110 does nothing and the process ends.

It should be noted that details of operation T1 can be ascertained with reference to the paragraphs above, and a description in this regard will not be repeated.

In operation T2, the multi-core processor 110 acquires the computing performance corresponding to the current processor configuration from a power cost table. In one embodiment, the power cost table may be stored in the memory 120. In one embodiment, the power cost table may record the processor configurations, the computing performances corresponding to the processor configurations, and the power consumptions corresponding to the processor configurations.

In operation T3, the multi-core processor 110 acquires the number of the maximum effective processor cores. Details of this operation can be ascertained with reference to the paragraphs above, and a description in this regard will not be repeated.

In operation T4, the multi-core processor 110 finds an updating processor configuration by determining the candidate processor configurations and selecting one of the candidate processor configurations as an updating processor configuration. In one embodiment, the multi-core processor 110 determines a plurality of candidate processor configurations with computing performances greater than a current computing performance corresponding to the current processor configuration and with the active processor core number not greater than the maximum effective processor cores. Subsequently, the multi-core processor 110 selects one of the candidate processor configurations according to power consumptions corresponding to the candidate processor configurations to serve as the updating processor configuration. Details of this operation can be ascertained with reference to the paragraphs above, and a description in this regard will not be repeated.

If the updating processor configuration can be found, operation T5 is performed. If not, the multi-core processor 110 does nothing and the process ends.

In operation T5, the multi-core processor 110 applies the updating processor configuration, so that the multi-core processor 110 executes tasks according to the active processor core number and the processor frequency of the updating processor configuration.

Through the operations described above, the performance of the multi-core processor 110 can be increased while taking into consideration power consumption.

Details of the present disclosure are described in the paragraphs below with reference to a management method in FIG. 4. However, the present disclosure is not limited to the embodiment below.

Figure 4:
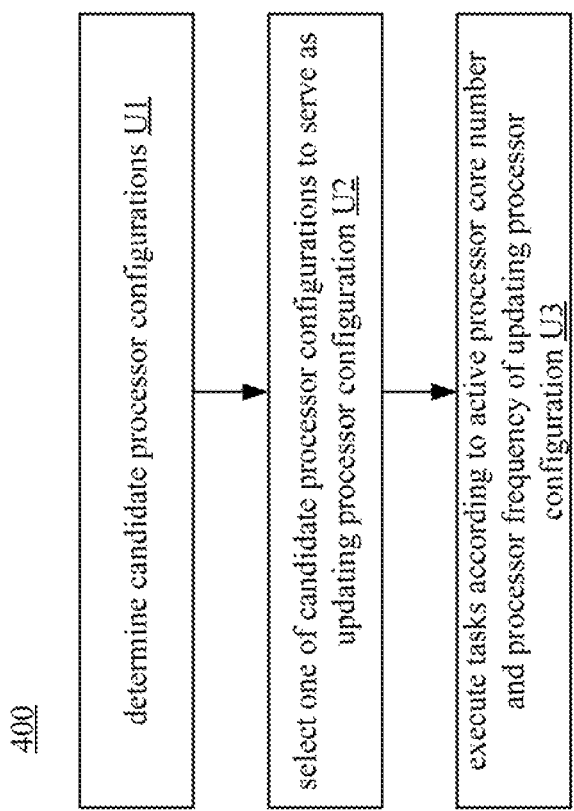
FIG. 4 is a flowchart of a management method in accordance with another embodiment of the present disclosure.

Reference is made to FIGS. 1 and 4. The management method 400 includes the operations below.

In operation U1, the multi-core processor 110 determines a plurality of candidate processor configurations with power consumptions lower than the current power consumption corresponding to the current processor configuration. In one embodiment, the candidate processor configurations are a part of processor configurations stored in the memory 120. In one embodiment, each of the candidate processor configurations includes an active processor core number and a processor frequency.

In one embodiment, the determination of the candidate processor configurations is executed when there is a need to decrease the performance of the multi-core processor 110. In one embodiment, when the average processor usage of the activated processor cores is less than a predetermined threshold (e.g., 60%), it is determined that there is a need to decrease the performance of the multi-core processor 110. In one embodiment, when a performance decreasing request is received (e.g., from a user, operating system scheduler, or an interior/exterior controller), it is determined that there is a need to decrease the performance of the multi-core processor 110. It should be noted that there can be a need to decrease the performance of the multi-core processor 110 under various conditions, and the present disclosure is not limited to the embodiment above.

In operation U2, the multi-core processor 110 selects one of the candidate processor configurations according to computing performances corresponding to the candidate processor configurations to serve as an updating processor configuration.

In one embodiment, the multi-core processor 110 may select one of the candidate processor configurations corresponding to a computing performance greater than the computing performances corresponding to the other candidate processor configurations. That is, the computing performance corresponding to the selected candidate processor configuration (i.e., the updating processor configuration) may be the greatest among the computing performances corresponding to the candidate processor configurations.

In operation U3, after the updating processor configuration is determined, the multi-core processor 110 executes the tasks according to the active processor core number and the processor frequency of the updating processor configuration.

Through the operations described above, the performance of the multi-core processor 110 can be decreased while taking into consideration power consumption.

In one embodiment of the present disclosure, in operation U1, the multi-core processor 110 may further acquire a number of maximum effective processor cores. Details of the number of the maximum effective processor cores can be ascertained with reference to the paragraphs above, and a description in this regard will not be repeated.

After the number of the maximum effective processor cores is acquired, the multi-core processor 110 determines the candidate processor configurations with the power consumptions lower than the current power consumption corresponding to the current processor configuration and with active processor core numbers not greater than the number of the maximum effective processor cores.

With such operations, activating more processor cores than what is needed can be avoided, so as to avoid wasting resources.

In one embodiment of the present disclosure, in operation U2, when there is a need to decrease the performance of the multi-core processor 110 more significantly, the multi-core processor 110 may select the updating processor configuration with the operations described below.

Firstly, the multi-core processor 110 can select a preliminary selected processor configuration of the candidate processor configurations with a computing performance greater than computing performances corresponding to the other of the candidate processor configurations.

Subsequently, the multi-core processor 110 can determine a plurality of secondary candidate processor configurations with power consumptions lower than a power consumption corresponding to the preliminary selected processor configuration, in which the secondary candidate processor configurations are within the candidate processor configurations.

After the secondary candidate processor configurations are determined, the multi-core processor 110 can select one of the secondary candidate processor configurations according to computing performances corresponding to the secondary candidate processor configurations to serve as the updating processor configuration. In one embodiment, the computing performance corresponding to the selected one of the secondary candidate processor configurations (i.e., the updating processor configuration) is greater than computing performances corresponding to the other of the secondary candidate processor configurations.

It should be noted that the operations described above can be iterated one or more times depending on actual requirements, and the present disclosure is not limited to the embodiment above.

In some embodiments, when the average processor usage of the activated processor cores is lower than a predetermined threshold (e.g., 30%), or the average processor usage of the activated processor cores is greater than a predetermined threshold (e.g., 60%) for a certain period (e.g., 200 ms), there may be a need to decrease the performance of the multi-core processor 110 more significantly.

With such operations, the performance of the multi-core processor 110 can be decreased more significantly.

To allow the disclosure to be more fully understood, an illustrative example is described in the paragraphs below, but the present disclosure is not limited to the example below.

Referring to table TB1 illustrated above, in this illustrative example, the current processor configuration is the processor configuration #8, and the number of the maximum effective processor cores is 5. When there is a need to decrease the performance of the multi-core processor 110, the multi-core processor 110 determines that the processor configurations #5, #4, #2, #1, #0 are the candidate processor configurations with the power consumptions lower than the current power consumption and the active processor core number not greater than the number of the maximum effective processor cores.

Subsequently, the multi-core processor 110 selects the processor configuration #5 from the candidate processor configurations as the updating processor configuration because the computing performance corresponding to the processor configuration #5 is the greatest among the computing performances corresponding to the candidate processor configurations. Subsequently, the processor configuration #5 is applied and the tasks are executed by the multi-core processor 110 according to the processor configuration #6.

In an alternative embodiment, when there is a need to decrease the performance of the multi-core processor 110 more significantly, after the processor configurations #5, #4, #2, #1, #0 are determined as the candidate processor configurations, the multi-core processor 110 selects the processor configuration #5 from the candidate processor configurations as the preliminary selected processor configuration because the computing performance corresponding to the processor configuration #5 is the greatest among the computing performances corresponding to the candidate processor configurations.

Subsequently, the multi-core processor 110 determines that the processor configurations #2, #1, #0 are secondary candidate processor configurations with the power consumptions lower than the power consumption corresponding to the preliminary selected processor configuration (i.e., the processor configuration #5) and the active processor core numbers not greater than the number of the maximum effective processor cores.

Subsequently, the multi-core processor 110 selects the processor configuration #2 from the secondary candidate processor configurations as the updating processor configuration because the computing performance corresponding to the processor configuration #2 is the greatest among the computing performances corresponding to the secondary candidate processor configurations. Subsequently, the processor configuration #2 is applied and the tasks are executed by the multi-core processor 110 according to the processor configuration #2.

Through the operations described above, the performance of the multi-core processor 110 can be decreased while taking into consideration power consumption.

Another embodiment of the present disclosure is described in the paragraphs below with reference to a management method in FIG. 5. However, the present disclosure is not limited to the embodiment below.

Figure 5:
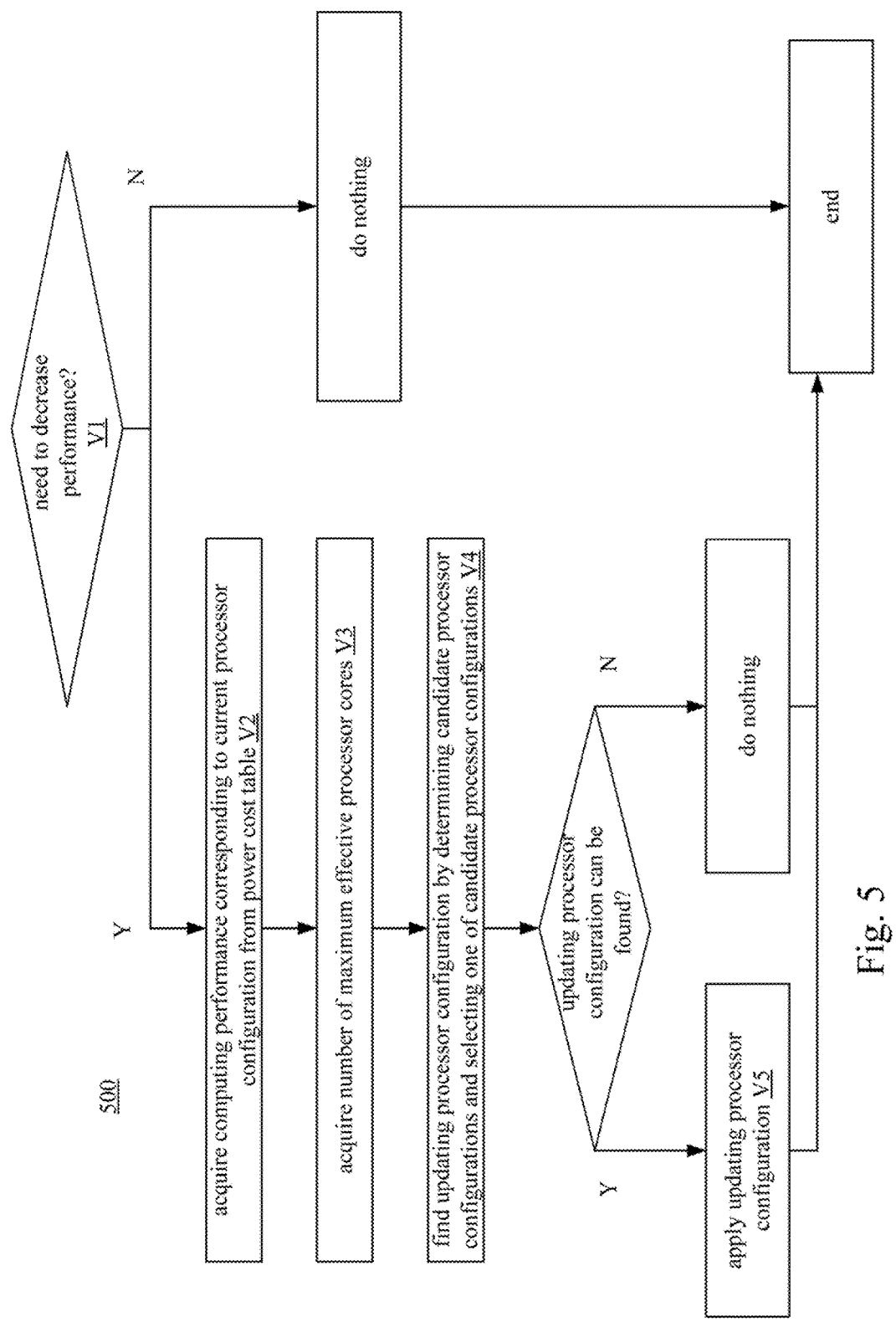
FIG. 5 is a flowchart of a management method in accordance with another embodiment of the present disclosure.

Reference is made to FIGS. 1 and 5. The management method 500 includes the operations below.

In operation V1, the multi-core processor 110 determines whether there is a need to decrease the performance of the multi-core processor 110. If so, operation V2 is performed. If not, the multi-core processor 110 does nothing and the process ends.

It should be noted that details of operation V1 can be ascertained with reference to the paragraphs above, and a description in this regard will not be repeated.

In operation V2, the multi-core processor 110 acquires the computing performance corresponding to the current processor configuration from a power cost table. Details of the power cost table can be ascertained with reference to the paragraphs above, and a description in this regard will not be repeated.

In operation V3, the multi-core processor 110 acquires the number of the maximum effective processor cores. Details of this operation can be ascertained with reference to the paragraphs above, and a description in this regard will not be repeated.

In operation V4, the multi-core processor 110 finds an updating processor configuration by determining the candidate processor configurations and selecting one of the candidate processor configurations as an updating processor configuration. In one embodiment, the multi-core processor 110 determines a plurality of candidate processor configurations with power consumptions lower than the current power consumption corresponding to the current processor configuration and with the active processor core number not greater than the maximum effective processor cores. Subsequently, the multi-core processor 110 selects one of the candidate processor configurations according to computing performances corresponding to the candidate processor configurations to serve as the updating processor configuration. Details of this operation can be ascertained with reference to the paragraphs above, and a description in this regard will not be repeated.

If the updating processor configuration can be found, operation V5 is performed. If not, the multi-core processor 110 does nothing and the process ends.

In operation V5, the multi-core processor 110 applies the updating processor configuration, so that the multi-core processor 110 executes tasks according to the active processor core number and the processor frequency of the updating processor configuration.

Through the operations described above, the performance of the multi-core processor 110 can be decreased while taking into consideration power consumption.

It should be noted that, in some embodiments, the performance increasing method, such as the methods 200, 300, and the performance decreasing method, such as the methods 400, 500 can be applied to an electronic device concurrently, and the present disclosure is not limited to the embodiments described above.

It should be noted that the management methods described above can be applied to an electronic device having a structure that is the same as or similar to the structure of the electronic device 100 shown in FIG. 1. To simplify the description above, the embodiment shown in FIG. 1 is used as an example to describe the management method according to an embodiment of the present disclosure. However, the present disclosure is not limited to application to the embodiment shown in FIG. 1.

It should be noted that, in some embodiments, the management methods described above may be implemented as a computer program. When the computer program is executed by a computer, an electronic device, or the multi-core processor 110 in FIG. 1, this executing device performs the management method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the management methods described above, no particular sequence is required unless otherwise specified. Moreover, the operations of the management methods described above also may be performed simultaneously or the execution times thereof may at least partially overlap.

Furthermore, the operations of the management method described above may be added to, replaced, and/or eliminated as appropriate, in accordance with various embodiments of the present disclosure.

Although the present invention has been described in considerable detail with reference to certain embodiments thereof, other embodiments are possible. Therefore, the scope of the appended claims should not be limited to the description of the embodiments contained herein.

What is claimed is:

1. A management method for a multi-core processor, the management method comprising:
    determining a plurality of candidate processor configurations with computing performances greater than a current computing performance corresponding to a current processor configuration, wherein each of the candidate processor configurations comprises an active processor core number and a processor frequency;
    selecting one of the candidate processor configurations according to power consumptions corresponding to the candidate processor configurations to serve as an updating processor configuration, wherein the updating processor configuration has (a) a power consumption that is the lowest among the power consumptions of the candidate processor configurations, and (b) the processor frequency that is lower than the processor frequency of the current processor configuration; and
    executing tasks according to the active processor core number and the processor frequency of the updating processor configuration.

2. The method as claimed in claim 1, wherein the operation of determining a plurality of candidate processor configurations comprises:
    acquiring a number of maximum effective processor cores, wherein the number of the maximum effective processor cores correspond to a maximum number of the tasks being able to be concurrently executed; and
    determining the candidate processor configurations with the computing performances greater than the current computing performance corresponding to the current processor configuration and with active processor core numbers not greater than the number of the maximum effective processor cores.

3. The method as claimed in claim 1, wherein the operation of selecting one of the candidate processor configurations according to the power consumptions corresponding to the candidate processor configurations comprises:
    designating the selected one of the candidate processor configurations as a preliminary selected processor configuration;
    determining a plurality of secondary candidate processor configurations with computing performances greater than a computing performance corresponding to the preliminary selected processor configuration, wherein the secondary candidate processor configurations are determined from among the candidate processor configurations;
    selecting one of the secondary candidate processor configurations according to power consumptions corresponding to the secondary candidate processor configurations, wherein the power consumption corresponding to the selected secondary processor configuration is the lowest among the power consumptions corresponding to the secondary candidate processor configurations; and
    using the selected preliminary selected processor configuration to serve as the updating processor configuration, or instead of the preliminary selected processor configuration, using the selected secondary candidate processor configuration to serve as the updating processor configuration.

4. The method as claimed in claim 3, wherein a power consumption corresponding to the selected one of the secondary candidate processor configurations is lower than power consumptions corresponding to the other of the secondary candidate processor configurations.

5. The method as claimed in claim 3, further comprising:
    determining whether an average processor usage of activated processor cores of the current processor configuration is greater than a first predetermined threshold;
    determining whether the average processor usage of the activated processor cores of the current processor configuration is greater than a second predetermined threshold, wherein the second predetermined threshold is higher than the first predetermined threshold;
    in response to determining that the average processor usage of the activated processor cores of the current processor configuration is greater than the first predetermined threshold but less than the second predetermined threshold, using the selected preliminary selected processor configuration to serve as the updating processor configuration; and
    in response to determining that the average processor usage of the activated processor cores of the current processor configuration is greater than the second predetermined threshold, using the selected secondary candidate processor configuration to serve as the updating processor configuration;
    wherein each of the first predetermined threshold and the second predetermined threshold is applied equally to each of the processor configurations.

6. An electronic device comprising:
    a multi-core processor;
    a memory electrically connected to the multi-core processor; and
    one or more programs, wherein the one or more programs are stored in the memory and configured to be executed by the multi-core processor, the one or more programs comprising instructions for:
    determining a plurality of candidate processor configurations with computing performances greater than a current computing performance corresponding to a current processor configuration, wherein each of the candidate processor configurations comprises an active processor core number and a processor frequency;
    selecting one of the candidate processor configurations according to power consumptions corresponding to the candidate processor configurations to serve as an updating processor configuration, wherein the updating processor configuration has (a) a power consumption that is the lowest among the power consumptions of the candidate processor configurations, and (b) the processor frequency that is lower than the processor frequency of the current processor configuration; and
    executing tasks according to the active processor core number and the processor frequency of the updating processor configuration.

7. The electronic device as claimed in claim 6, wherein the one or more programs comprise instructions for:
acquiring a number of maximum effective processor cores, wherein the number of the maximum effective processor cores correspond to a maximum number of the tasks being able to be concurrently executed; and
determining the candidate processor configurations with the computing performances greater than the current computing performance corresponding to the current processor configuration and with active processor core numbers not greater than the number of the maximum effective processor cores.

8. The electronic device as claimed in claim 6, wherein the one or more programs comprise instructions for:
selecting a preliminary selected processor configuration of the candidate processor configurations with a power consumption lower than power consumptions corresponding to the other of the candidate processor configurations;
determining a plurality of secondary candidate processor configurations with computing performances greater than a computing performance corresponding to the preliminary selected processor configuration, wherein the secondary candidate processor configurations are within the candidate processor configurations; and
selecting one of the secondary candidate processor configurations according to power consumptions corresponding to the secondary candidate processor configurations to serve as the updating processor configuration.

9. The electronic device as claimed in claim 8, wherein a power consumption corresponding to the selected one of the secondary candidate processor configurations is lower than power consumptions corresponding to the other of the secondary candidate processor configurations.

10. A management method for a multi-core processor, the management method comprising:
determining a plurality of candidate processor configurations with power consumptions lower than a current power consumption corresponding to a current processor configuration, wherein each of the candidate processor configurations comprises an active processor core number and a processor frequency;
selecting one one of the candidate processor configurations according to computing performances corresponding to the candidate processor configurations to serve as an updating processor configuration, wherein the updating processor configuration has (a) a computing performance that is the greatest among the computing performances of the candidate processor configurations, and (b) the processor frequency of one of the candidate processor configurations is greater than the processor frequency of the current processor configuration; and
executing tasks according to the active processor core number and the processor frequency of the updating processor configuration.

11. The method as claimed in claim 10, wherein the operation of determining a plurality of candidate processor configurations comprises:
acquiring a number of maximum effective processor cores, wherein the number of the maximum effective processor cores correspond to a maximum number of the tasks being able to be concurrently executed; and
determining the candidate processor configurations with the power consumptions lower than the current power consumption corresponding to the current processor configuration and with active processor core numbers not greater than the number of the maximum effective processor cores.

12. The method as claimed in claim 10, the operation of selecting one of the candidate processor configurations according to the power consumptions corresponding to the candidate processor configurations comprises:
selecting a preliminary selected processor configuration of the candidate processor configurations with a computing performance greater than computing performances corresponding to the other of the candidate processor configurations;
determining a plurality of secondary candidate processor configurations with power consumptions lower than a power consumption corresponding to the preliminary selected processor configuration, wherein the secondary candidate processor configurations are within the candidate processor configurations; and
selecting one of the secondary candidate processor configurations according to computing performances corresponding to the secondary candidate processor configurations to serve as the updating processor configuration.

13. The method as claimed in claim 12, wherein a computing performance corresponding to the selected one of the secondary candidate processor configurations is greater than computing performances corresponding to the other of the secondary candidate processor configurations.

14. An electronic device comprising:
a multi-core processor;
a memory electrically connected to the multi-core processor; and
one or more programs, wherein the one or more programs are stored in the memory and configured to be executed by the multi-core processor, the one or more programs comprising instructions for:
determining a plurality of candidate processor configurations with power consumptions lower than a current power consumption corresponding to a current processor configuration, wherein each of the candidate processor configurations comprises an active processor core number and a processor frequency;
selecting one of the candidate processor configurations according to computing performances corresponding to the candidate processor configurations to serve as an updating processor configuration, wherein the updating processor configuration has (a) a computing performance that is the greatest among the computing performances of the candidate processor configurations, and (b) the processor frequency of one of the conidate processor configurations is greater than the processor frequency of the current processor configuration; and
executing tasks according to the active processor core number and the processor frequency of the updating processor configuration.

15. The electronic device as claimed in claim 14, wherein the one or more programs comprise instructions for:
acquiring a number of maximum effective processor cores, wherein the number of the maximum effective processor cores correspond to a maximum number of the tasks being able to be concurrently executed; and
determining the candidate processor configurations with the power consumptions lower than the current power consumption corresponding to the current processor configuration and with active processor core numbers not greater than the number of the maximum effective processor cores.

16. The electronic device as claimed in claim 14, wherein the one or more programs comprise instructions for:
- selecting a preliminary selected processor configuration of the candidate processor configurations with a computing performance greater than computing performances corresponding to the other of the candidate processor configurations;
- determining a plurality of secondary candidate processor configurations with power consumptions lower than a power consumption corresponding to the preliminary selected processor configuration, wherein the secondary candidate processor configurations are within the candidate processor configurations; and
- selecting one of the secondary candidate processor configurations according to computing performances corresponding to the secondary candidate processor configurations to serve as the updating processor configuration.

17. The electronic device as claimed in claim 16, wherein a computing performance corresponding to the selected one of the secondary candidate processor configurations is greater than computing performances corresponding to the other of the secondary candidate processor configurations.

* * * * *